United States Patent
Antonini et al.

(10) Patent No.: US 10,319,248 B2
(45) Date of Patent: Jun. 11, 2019

(54) AIRCRAFT STAND MANAGEMENT

(71) Applicant: Honeywell International Inc., Morris Plains, NJ (US)

(72) Inventors: Andrea Antonini, Dubai (AE); Karel Macek, Prague (CZ); Maksood Moidin Kadike, Dubai (AE)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/677,854

(22) Filed: Aug. 15, 2017

(65) Prior Publication Data

US 2019/0057613 A1   Feb. 21, 2019

(51) Int. Cl.
*G08G 5/06* (2006.01)
*G08G 5/00* (2006.01)

(52) U.S. Cl.
CPC ........... *G08G 5/065* (2013.01); *G08G 5/0026* (2013.01)

(58) Field of Classification Search
CPC ......................... G08G 5/065; G08G 5/0026
See application file for complete search history.

(56) References Cited

U.S. PATENT DOCUMENTS

| | | | |
|---|---|---|---|
| 2004/0090348 A1* | 5/2004 | Hutton ............... | B64F 1/00 340/958 |
| 2005/0071076 A1* | 3/2005 | Baiada ............... | G08G 5/0013 701/120 |
| 2012/0130818 A1* | 5/2012 | Katsuki ............... | G06Q 30/02 705/14.58 |
| 2013/0197681 A1* | 8/2013 | Alberth, Jr. ........ | G06F 1/163 700/94 |
| 2014/0195466 A1* | 7/2014 | Phillipps ............. | G06Q 10/04 706/12 |
| 2015/0151834 A1* | 6/2015 | Cox .................... | B64C 25/405 701/3 |
| 2015/0217873 A1* | 8/2015 | Cox .................... | B64F 1/225 414/800 |
| 2018/0082594 A1* | 3/2018 | Håkansson ......... | G08G 5/0013 |

OTHER PUBLICATIONS

Extended Search Report from related European Application No. 18188697, dated Nov. 22, 2018, 6 pages.
Communication Pursuant to Article 94(3) EPC from related European Application No. 18188697, dated Mar. 15, 2019, 3 pages.

* cited by examiner

*Primary Examiner* — Leon Flores
(74) *Attorney, Agent, or Firm* — Brooks, Cameron & Huebsch, PLLC

(57) ABSTRACT

Methods, devices, and systems for aircraft stand management are described herein. One device includes a memory, and a processor to execute executable instructions stored in the memory to receive information associated with arriving and departing flights at an airport, determine, using the received information, whether a conflict exists at a parking stand of the airport assigned to an aircraft, generate, using the received information, an airfield parking stand analysis, including a time chart for the parking stand and a list of different parking stands to assign to the aircraft in response to a conflict existing at the parking stand, and a user interface to display the airfield parking stand analysis in a single integrated display.

20 Claims, 6 Drawing Sheets

*(Figure rotated 90°)*

526 →

| RG610 | | |
|---|---|---|
| ✈ STAND C53L | ELDT 12:50 | STAND C58 | ELDT 12:50 |
| UAE123 TO BAN EDBT: 14:11 | | PENALTIES +20 MIN / +14K AED |
| UAE321 TO SYD EDBT: 14:15 | | PENALTIES +25 MIN / +20K AED |

| GW111 | | |
|---|---|---|
| ✈ STAND C56 | ELDT 13:35 | STAND C53L | ELDT 13:35 |
| UAX331 TO FCO EDBT: 14:30 | | PENALTIES +16 MIN / +7K AED |
| BA444 TO LHR EDBT: 14:35 | | PENALTIES +15 MIN / +10K AED |

< BACK TO SOLUTIONS

T031 SECURITY AREA
CHECKS SELECTED    AT TIME
6/8 (8 MIN / PAX)    13:00
CURRENTLY OPEN    STAFF AVAILABLE
2/8 (25 MIN / PAX)    3/8

S142 SECURITY AREA
CHECKS REQUIRED    AT TIME
6/8 (4 MIN / PAX)    13:45
CURRENTLY OPEN    STAFF AVAILABLE
4/8 (18 MIN / PAX)    4/10

HI,
I REQUEST THE OPENING OF 6 SECURITY CHECKS AT THE T031 SECURITY AREA, STARTING AT 13:00
THANK YOU
JOHN

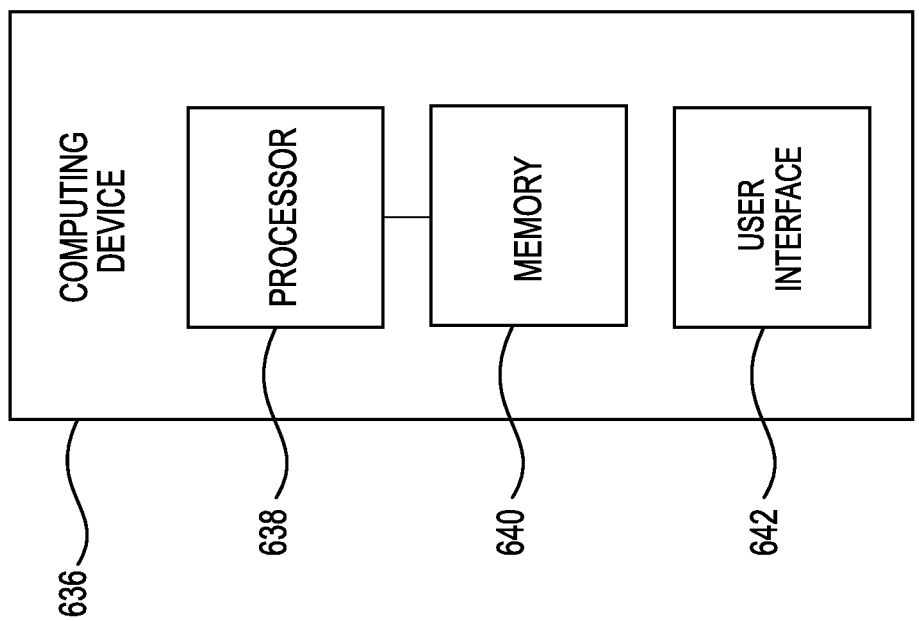

AIRCRAFT STAND MANAGEMENT

TECHNICAL FIELD

The present disclosure relates to methods, devices, and systems for aircraft stand management.

BACKGROUND

Airport Operational Command Center (AOCC) controllers at an airport can manage capacity and demand of aircraft parking stands at the airport. An AOCC controller or other user can utilize flight plans, flight schedules, and/or aircraft constraints such as aircraft size and/or airline terminal allocations in order to direct aircraft at the airport to parking stands to, for example, load and/or unload passengers and/or cargo.

Aircraft at an airport can utilize parking stands at the airport. As used herein, the term "parking stand" can, for example, refer to a location at the airport at which an aircraft can park. Parking stands can be located at a terminal building (e.g., contact parking stands) or remote from a terminal building (e.g., remote parking stands).

Contact parking stands at an airport are preferred over remote parking stands. For example, an aircraft can more conveniently load and/or unload passengers and/or cargo from a contact parking stand relative to a remote stand due to the proximity of the contact parking stand to the airport terminal.

BRIEF DESCRIPTION OF THE DRAWINGS

FIG. 5 is an illustration of a display provided on a user interface showing an assignment security impact analysis of a parking stand with messaging options, in accordance with one or more embodiments of the present disclosure FIG. 6 is a computing device for aircraft stand management, in accordance with one or more embodiments of the present disclosure.

DETAILED DESCRIPTION

Figure 1:
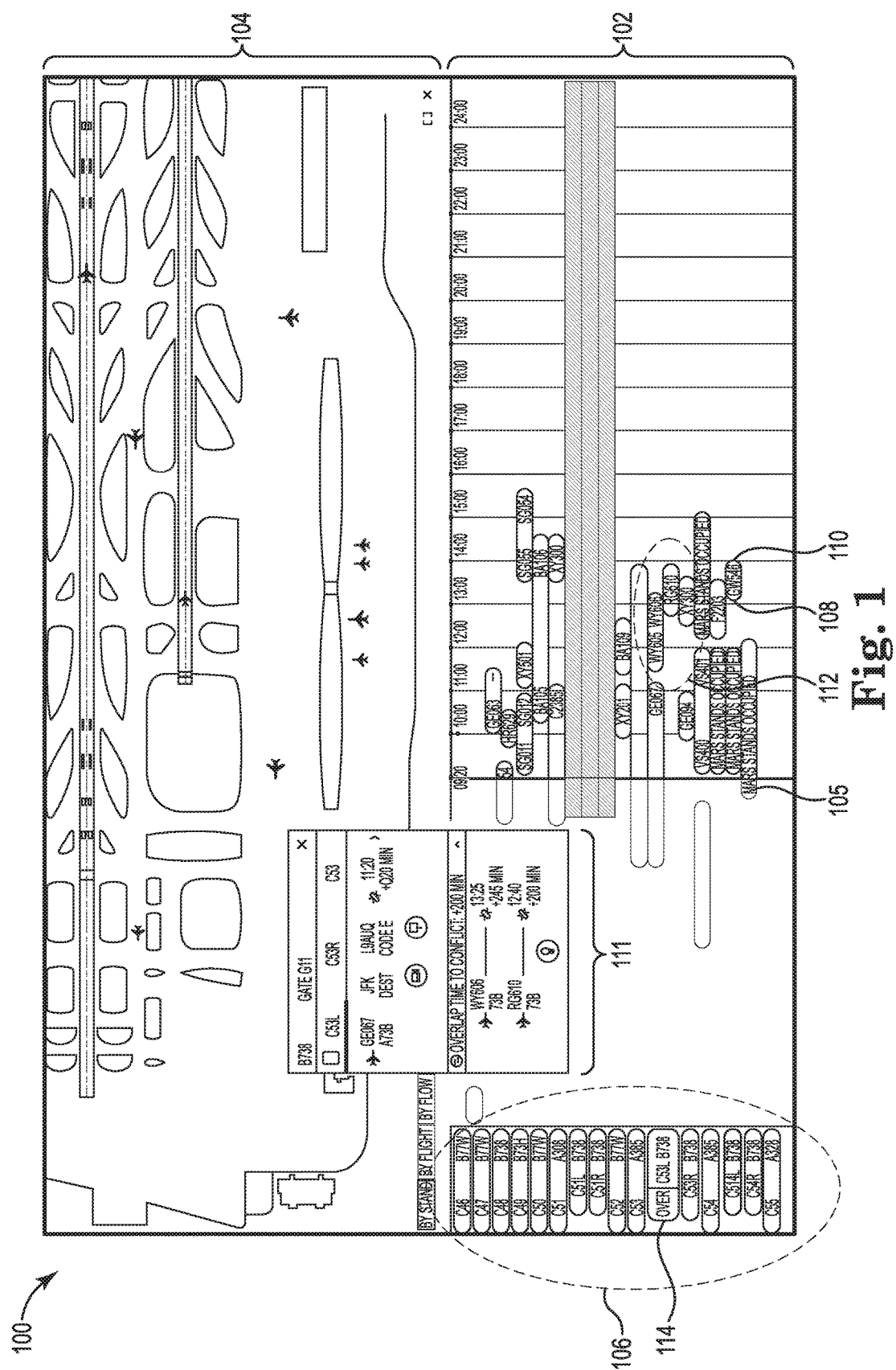
FIG. 1 is an illustration of a display provided on a user interface showing an airfield parking stand analysis, generated in accordance with one or more embodiments of the present disclosure.

Methods, devices, and systems for aircraft stand management are described herein. In some examples, one or more embodiments include a memory, and a processor to execute executable instructions stored in the memory to receive information associated with arriving and departing flights at an airport, determine, using the received information, whether a conflict exists at a parking stand of the airport assigned to an aircraft, generate, using the received information, an airfield parking stand analysis, including a time chart for the parking stand and a list of different parking stands to assign to the aircraft in response to a conflict existing at the parking stand, and a user interface to display the airfield parking stand analysis in a single integrated display.

Aircraft stand management, in accordance with the present disclosure, can allow a user, such as a controller, to monitor and assign airfield parking stands. For example, controllers can quickly determine the status of various airfield parking stands, assign, and/or reassign aircraft to various airfield parking stands utilizing benefits and/or penalties of various attributes that may be calculated in terms of impact on passengers, other aircraft, the airport, etc. Aircraft stand management can be adaptable to different airport systems and layouts, and can provide for a safe and efficient airfield environment and reduce delays for passengers and/or airlines.

Aircraft stand management, including a time chart and/or an airport map showing aircraft at the airport, can be displayed on a single integrated display. Presenting the aircraft stand management in a single integrated display can allow the user or others to quickly determine awareness regarding airport operations. Controllers and/or other users can utilize the displayed parking stand management to quickly determine the status of various parking stands around the airfield of the airport. A user, as used herein, may include an air traffic controller and/or an airport operational command center controller, among other users.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 100 may reference element "00" in FIG. 1, and a similar element may be referenced as 200 in FIG. 2.

FIG. 1 is an illustration of a display provided on a user interface (e.g., user interface 642, as described in connection with FIG. 6) showing an airfield parking stand analysis 100, generated in accordance with one or more embodiments of the present disclosure. As illustrated in FIG. 1, the airfield parking stand analysis 100 can include a time chart 102 for the parking stand, airport map 104, parking stands 106, estimated or scheduled in block time 108, estimated or scheduled off block time 110, conflict 112 at a parking stand, and conflict 114 at a parking stand.

The airfield parking stand analysis 100 can be generated by a computing device (e.g., computing device 636, as described in connection with FIG. 6) based on information associated with arriving and departing flights at an airport.

Information associated with arriving and departing flights at an airport can be received by the computing device from various systems of the airport, including airfield surveillance system sensors, flight information systems, flight data processing systems, airport operations databases, and/or other third party systems.

The computing device can determine, using the received information associated with arriving and departing flights at an airport, whether a conflict exists at a parking stand assigned to an aircraft. The computing device can utilize various methods to determine whether a conflict exists at a parking stand, as is described in connection with FIG. 6. As used herein, the term "conflict" can, for example, refer to a situation in which more than one aircraft is assigned to the same parking stand at the same time, and/or when an aircraft size is incompatible with a size restriction of the parking stand (e.g., the aircraft is too large to fit at the parking stand). For example, an aircraft may be delayed from leaving its assigned parking stand, and a different aircraft assigned to the parking stand may arrive at the airport prior to the delayed aircraft leaving the assigned parking stand, among other examples.

The computing device can generate, using the received information associated with arriving and departing flights at an airport, the airfield parking stand analysis 100. As illustrated in FIG. 1, the airfield parking stand analysis 100 can include time chart 102 for the parking stand, airport map 104, and parking stands 106. Although not shown in FIG. 1, airfield parking stand analysis 100 can include a parking stand assignment penalty analysis (e.g., as is further described in connection with FIG. 3) and a parking stand assignment security impact analysis (e.g., as is further described in connection with FIGS. 4 and 5).

The airport map 104 can show parking stands and aircraft at the airport. For example, airport map 104 can show a geographical layout of the airport including the locations of the parking stands at the airport, as well as locations of aircraft at the airport. For instance, the aircraft corresponding to flight UAE243 is illustrated in FIG. 1 as being parked at parking stand F10.

The airport map 104 can be updated in real time. For example, as the aircraft corresponding to flight UAE 243 pushes back from the gate, taxis to the runway, and takes off, the airport map 104 can be correspondingly updated. The airport map 104 can include a status of the parking stand. For example, the parking stand may be occupied or unoccupied, in conflict, not in conflict, etc.

Airfield parking stand analysis 100 can include a time chart 102 for the parking stand. As illustrated in FIG. 1, the time chart 102 for the parking stand can include parking stands 106. Parking stands 106 can include the parking stands included as part of the airfield. As illustrated in FIG. 1, parking stands 106 can include parking stands C46 through C55. However, embodiments of the present disclosure are not limited to parking stands C46 through C55. For example, parking stands 106 can be scrollable via a user input such that a user can view other parking stands included in the airfield.

Time chart 102 for the parking stand can show estimated or scheduled in block times of aircraft at the respective parking stands at the airport. As used herein, the term "in block time" can, for example, refer to a time at which an aircraft is expected/scheduled to park at the parking stand. For example, the aircraft corresponding to flight GW546 has a scheduled in block time 108 at gate C54R of 13:15.

Time chart 102 for the parking stand can show estimated or scheduled off block times of aircraft at the respective parking stands at the airport. As used herein, the term "off block time" can, for example, refer to a time at which an aircraft parked at the parking stand is expected/scheduled to depart the parking stand. Continuing with the example above, the aircraft corresponding to flight GW546 has a scheduled off block time 110 at gate C54R of 14:00.

Estimated in block and off block times may be updated as changes to the aircraft scheduling occur. For example, estimated in block and off block times may change as flight schedule changes happen, which may occur as a result of delays due to airport operations, weather changes, etc. Estimated in block and off block times may be dynamic, as opposed to scheduled in block and off block times, which may be used to gauge the degree to which an aircraft is early or late to various flight milestones, including arrival, in block and/or off block.

As illustrated in FIG. 1, time chart 102 for the parking stand can be represented by a Gantt chart. As used herein, the term "Gantt chart" can, for example, refer to a type of bar chart that can illustrate the start and finish times of elements included in the chart. For example, time chart 102 for the parking stand can show the respective estimated in block times and off block times of aircraft at the respective parking stands at the airport.

Utilizing time chart 102 for the parking stand, a user can easily determine when a conflict exists at a parking stand. For instance, a conflict 112 at a parking stand can exist when an in block time of an aircraft assigned to the parking stand and an in block time of a different aircraft assigned to the parking stand overlap.

For example, as shown in FIG. 1, a conflict 112 at a parking stand can exist as a result of an estimated in block time of an aircraft corresponding to flight RG610 overlapping with an estimated in block time of an aircraft corresponding to flight WY605 at parking stand C53L. The conflict 112 at a parking stand may be the result of the aircraft corresponding to flight RG610 arriving at the airport early (e.g., relative to the scheduled arrival time), or the aircraft corresponding to flight WY605 being delayed (e.g., from the scheduled departure time) from leaving parking stand C53L, among other reasons for the conflict 112 at a parking stand.

The time chart 102 for the parking stand can display parking stand conflicts at the airport before they occur. For instance, the current time 105 as displayed to the user is 9:20, whereas the conflict 112 at a parking stand may occur at 12:40 if no action is taken to remedy the parking stand conflict. Utilizing the time chart 102 for the parking stand, a user can determine, prior to a parking stand conflict occurring on the airfield of the airport, where a parking stand conflict may occur.

As illustrated in FIG. 1, time chart 102 for the parking stand can include conflict 114 at a parking stand. Conflict 114 at a parking stand can be shown as part of parking stands 106. That is, the conflict at a parking stand can be shown to a user in multiple ways. For example, the conflict at parking stand C53L can be shown as conflict 112 at a parking stand utilizing estimated in block and off block times, as well as conflict 114 at a parking stand utilizing parking stands 106.

A user can find further information regarding a parking stand conflict. For example, the computing device can generate, in response to a user input, further information regarding conflict 112 and 114 by, for example, clicking conflict 112 or conflict 114. The further information can be shown in conflict information window 111. Conflict information window 111 can give a user further information such as the origin airports of each aircraft included in the parking stand conflict, aircraft types, destinations, arrival and/or departure times, time until parking stand conflict occurs, etc.

The computing device can generate a list of parking stands to assign to the aircraft in response to a conflict existing at the parking stand. Continuing with the example from above, a conflict exists at parking stand C53L. The computing device can generate a list of parking stands to assign to the aircraft corresponding to flight RG610 or to the aircraft corresponding to flight WY605, as is further described in connection with FIG. 2.

In some examples, the computing device can assign an aircraft to one of the different parking stands 106 in response to the conflict existing at the parking stand. For instance, the computing device can assign the aircraft corresponding to flight RG610 to parking stand C52, which may be open and free during the estimated in block and off block times of the aircraft corresponding to flight RG610, among other open parking stands. In some instances, the computing device can propose to assign the aircraft corresponding to flight WY605 to parking stand C50, which may be open during the estimated in block and off block times of the aircraft corresponding to flight WY605, among other open parking stands. In other words, the computing device can assign an aircraft assigned to a parking stand with a conflict existing to a different parking stand that is open and free. The computing device can assign an aircraft to one of the different parking stands 106 in response to the conflict existing at the parking stand automatically or in response to a user input.

In some examples, the computing device can re-assign a different aircraft assigned to the different one of the parking stands 106 to the parking stand. For instance, the computing device can assign the aircraft corresponding to flight RG610 from parking stand C53L, where a conflict exists, to parking stand C56. The aircraft corresponding to flight GW111 assigned to parking stand C56 can be assigned to parking stand C53L. In other words, the computing device can re-assign a first aircraft at a first parking stand to a second parking stand, and re-assign a second aircraft at the second parking stand to the first parking stand, in effect swapping the first aircraft and the second aircraft to each other's parking stands. Effecting the re-assignment of parking stands of both aircraft can alleviate the conflict that exists at parking stand C53L without creating a conflict at parking stand C56 based on the estimated in block and off block times of the aircraft corresponding to flights RG610 and GW111. The computing device can re-assign a different aircraft assigned to the different one of the parking stands 106 to the parking stand automatically or in response to a user input.

Aircraft stand management, according to the present disclosure, can allow users to quickly choose between parking stand reallocation options, reducing a user's cognitive workload and increase time for parking stand planning. An airport may benefit from improved efficiency and reduction in costs, which may result in less passenger and/or airline delays that can improve a travel experience for consumers.

Figure 2:
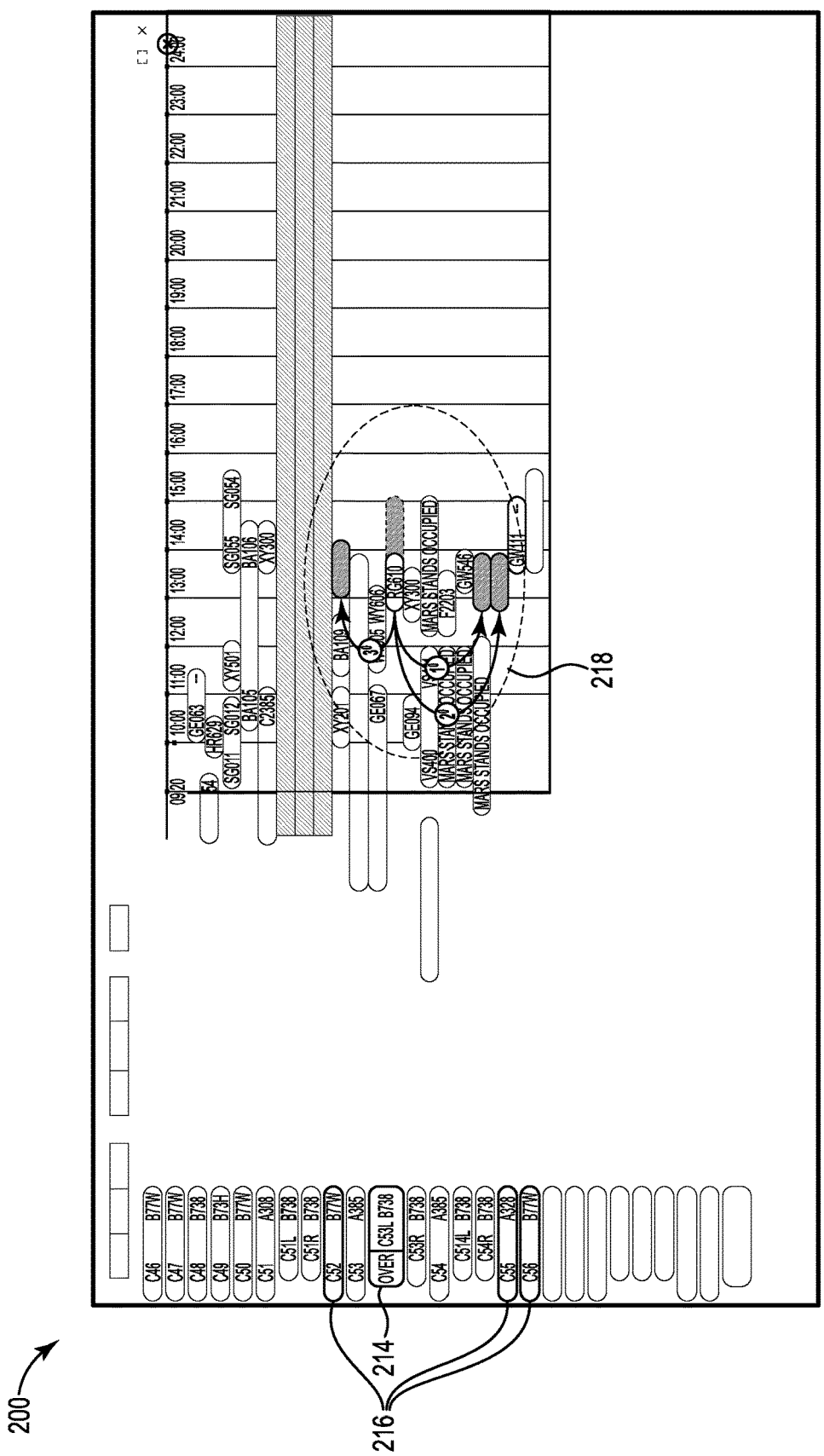
FIG. 2 is an illustration of a display provided on a user interface showing an airfield parking stand analysis with a prioritized list of parking stands, generated in accordance with one or more embodiments of the present disclosure.

FIG. 2 is an illustration of a display provided on a user interface showing an airfield parking stand analysis 200 (e.g., airfield parking stand analysis 100, previously described in connection with FIG. 1) with a prioritized list 218 of parking stands, generated in accordance with one or more embodiments of the present disclosure. Airfield parking stand analysis 200 can include conflict 214 at a parking stand, parking stands 216 available for assignment, and prioritized list 218 of parking stands.

As previously described in connection with FIG. 1, the computing device can generate a list of parking stands 216 to assign to the aircraft in response to a conflict existing at a parking stand. The list of parking stands 216 can include parking stands that may be highlighted to draw attention to a user to the availability of available parking stands 216. For example, the list of parking stands 216 can include parking stands that are of a different color, include a notification, etc. to draw attention to the user to the availability of the parking stands for assignment.

The generated list of parking stands can be prioritized. As illustrated in FIG. 2, prioritized list 218 of parking stands can be generated for a user. For example, a prioritized list 218 can include three options for a user to alleviate a conflict at parking stand C53L. The first option, and most highly prioritized, can include assigning the aircraft corresponding to flight RG610 to an open and free parking stand (e.g., parking stand C55). The second option, and prioritized in the middle, can include assigning the aircraft corresponding to flight RG610 from parking stand C53L to parking stand C56, and assigning the aircraft corresponding to flight GW111 from parking stand C56 to parking stand C53L. The third option, and least prioritized, can include assigning the aircraft corresponding to flight RG610 from parking stand C53L to parking stand C52 by delaying the in block time of flight RG610.

The prioritized list 218 of different parking stands can be prioritized according to various attributes. For example, the computing device can utilize parking stand attributes, passenger attributes, reallocation impact attributes, aircraft scheduling attributes, and/or airline attributes in order to prioritize the prioritized list 218 of parking stands.

Parking stand attributes can include attributes such as the parking stand status (e.g., whether the parking stand is free or occupied) and/or parking stand type (e.g., whether the parking stand is a contact parking stand or a remote parking stand). Parking stand attributes can include other attributes such as parking stand category, such as flight categories allowed, among other parking stand attributes. The flight categories can correspond to aircraft size restrictions. For example, parking stand C53L may be able to accommodate a larger sized aircraft, whereas parking stand C56 may be able to accommodate aircraft below a threshold size.

Passenger attributes can include attributes that may affect passengers aboard re-assigned aircraft. For example, passenger attributes can include a number of passengers on board an aircraft to be assigned or re-assigned, including a total number of passengers, a number of connecting passengers (e.g., passengers that may be boarding a connecting flight from the airport), and/or a number of destination passengers (e.g., passengers that have the airport as their final destination). The passenger attributes can include connecting passengers transfer time to a gate of a connecting flight from the airport, which can include an amount of time to pass through security checkpoints experienced by connecting passengers from an arrival gate to a gate of the connecting flight. The passenger attributes can include luggage transfer time of connecting passengers from an arrival gate to an aircraft at the gate of the connecting flight, among other passenger attributes.

Reallocation impact attributes can include attributes that may affect aircraft at the airport. As used herein, the term "reallocation impact" can, for example, refer to a monetary impact and/or an impact on time. For example, reallocation impact attributes can include effects of a reallocation of an aircraft to a different parking stand on connecting flights, such as changes to the estimated off block time of connecting flights and/or changes to scheduled off block time of connecting flights, including timing and/or monetary effects. Reallocation impact attributes can include effects on estimated landing times of other aircraft, effects on estimated in block times of other aircraft, impact of reallocation on passenger transfer times to connecting gates, impact of reallocation on luggage transfer times to connecting gates, including timing and/or monetary effects, among other reallocation impact attributes.

Aircraft scheduling attributes can include attributes that may affect the scheduling of aircraft at the airport. For example, aircraft scheduling attributes can include estimated landing times of aircraft to be reallocated and/or estimated in block times of flights to be reallocated, among other aircraft scheduling attributes.

Airline attributes can include airline and/or airport specific preferences. In some examples, airlines may be assigned to various terminals of an airport. In some examples, airlines may have specific security procedures that may be included in specific terminals of an airport.

The various attributes described above can be utilized by the computing device when generating the prioritized list 218 of parking stands available for assignment. In some examples, some attributes may be weighted more heavily than other attributes in generating the prioritized list 218.

Figure 3:
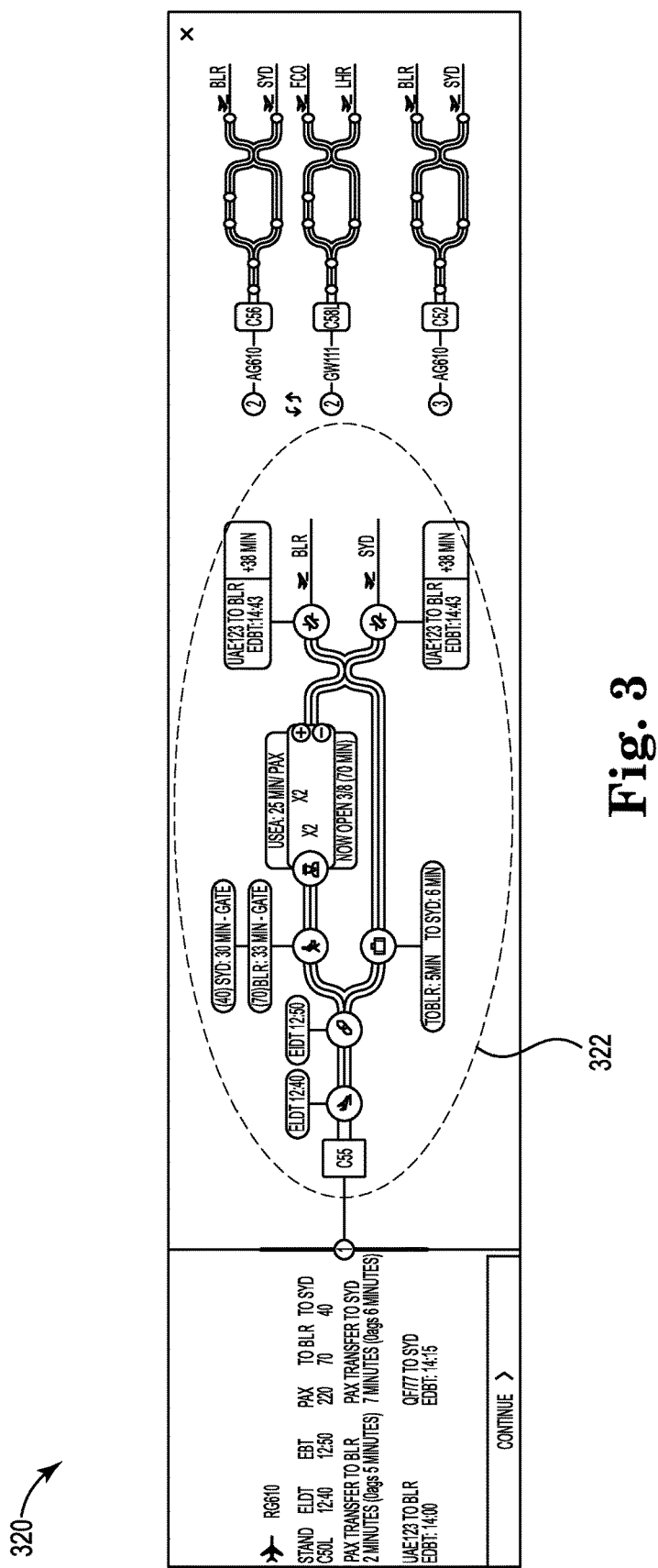
FIG. 3 is an illustration of a display provided on a user interface showing an assignment penalty analysis of a parking stand, generated in accordance with one or more embodiments of the present disclosure.

FIG. 3 is an illustration of a display provided on a user interface showing an assignment penalty analysis 320 of a parking stand, generated in accordance with one or more embodiments of the present disclosure. As illustrated in FIG. 3, the assignment penalty analysis 320 can include details 322 of the different parking stand.

Assignment penalty analysis 320 can include details 322 of the different parking stand. For example, prior to assigning an aircraft to one of the different parking stands, a user can review various details 322 regarding the assignment of the aircraft to one of the different parking stands. Details 322 can include the proposed parking stand allocation, the estimated landing time of the aircraft, the estimated in block time of the aircraft, the number of passengers on the aircraft (total number of passengers, and/or number of connecting passengers), destinations of connecting passengers, transfer time for connecting passengers to the connecting gate, transfer time of luggage of the connecting passengers to the aircraft at the connecting gate, recommended security checkpoints to be open, and/or connecting flights estimated off block times, among other details 322.

For example, as illustrated in FIG. 3, the aircraft corresponding to flight RG610 may have a proposed parking stand of C55, the estimated landing time of flight RG610 to be assigned to parking stand C55 is 12:40, and the estimated in block time is 12:50. Flight RG610 may include 40 passengers connecting to a flight to SYD with a transfer time of 7 minutes to the connecting gate, and 70 passengers connecting to a flight to BLR with a transfer time of 10 minutes to the connecting gate. The estimated transfer time for connecting passengers' luggage for the SYD connecting flight can be 5 minutes and the estimated transfer time for connecting passengers' luggage for the BLR connecting flight can be 6 minutes. Based on the proposed parking stand C55, details 322 can include a recommended number of two security checkpoints be opened. The estimated off block time for the connecting flight to SYD can be 14:15, and the estimated off block time for the connecting flight to BLR can be 14:20.

The assignment penalty analysis 320 can include penalties associated with details 322 of the different parking stands. The penalties can be estimated time and/or monetary effects of the proposed gate change of the aircraft corresponding to flight RG610 from parking stand C53L having the conflict to parking stand C55. In other words, the penalties can be measured relative to the originally assigned parking stand having the conflict.

Although not illustrated in FIG. 3, the penalties can be color coded. For example, each of details 322 can be color coded based on the effects of the proposed change from parking stand C53L to parking stand C55. The details 322 can include a color coding scheme such as green, yellow, and red, where green can indicate no penalty or a positive penalty, yellow can indicate a minor penalty, and red can indicate a major penalty.

For example, the proposed parking stand change to parking stand C55 can result in either no change or an early estimated landing time and/or estimated in block time, which can be indicated as green icons. The proposed parking stand change to parking stand C55 can result in faster transfer time of luggage of connecting passengers relative to the transfer time from parking stand C53L. However, the transit time of connecting passengers from parking stand C55 to their respective connecting gates may be longer, which can be indicated by a red icon. There may not be enough security checkpoints open to quickly and/or efficiently process connecting passengers, and the security details may be indicated as red icons. Additionally, the proposed parking stand change to parking stand C55 may result in changes to the estimated off block times of connecting flights leaving for BLR and/or SYD (e.g., the estimated off block time of the connecting flight to BLR may be estimated to be 36 minutes later than scheduled, and/or the estimated off block time of the connecting flight to SYD may be estimated to be 23 minutes later than scheduled), which may be indicated as red icons.

A user can determine associated monetary penalties associated with the proposed parking stand change. For example, based on the proposed parking stand change to parking stand C55, various details 322 may be indicated as color coded icons and display corresponding time penalties associated with the proposed parking stand change. In some examples, a user can, via a user input, view associated monetary penalties by causing a pointer corresponding to an input device, such as a mouse, to hover over various details 322. For instance, a user can determine monetary savings based on the early estimated landing time and/or estimated in block time (e.g., which can be indicated as green icons), and/or determine monetary losses based on the transit time of connecting passengers from parking stand C55 to their respective connecting gates being longer (e.g., which can be indicated as red icons). In other words, monetary savings and/or losses can be viewed via green and/or red icons, respectively, and neutral monetary changes can be viewed via yellow icons.

The computing device can revise the penalties of details 322 in response to a change in one of the details 322 of the different parking stands. For example, a user can increase the security checkpoints to be opened. In response to the change in the security checkpoints being opened, the details 322 may be revised. For instance, the transit time for connecting passengers to a connecting gate may be reduced, among other revised details 322. The icons of details 322 can be correspondingly updated. For example, the icon for transit time for connecting passengers to the connecting gate may be revised from yellow to green.

As illustrated in FIG. 3, the assignment penalty analysis 320 can show alternative parking stands included in the prioritized list of parking stands (e.g., prioritized list 218, previously described in connection with FIG. 2). A user can select a different parking stand of the list of prioritized parking stands to view penalties of details 322 of the different parking stand of the list of prioritized parking stands. Utilizing the alternative parking stands shown in the assignment penalty analysis 320, a user can easily compare between the list of prioritized parking stands to select the different parking stand that best suits the aircraft having to be assigned or re-assigned to a different parking stand.

In some examples, following the assignment penalty analysis 320, the computing device can assign an aircraft to one of the different parking stands in response to the conflict existing at the parking stand. In some examples, following the assignment penalty analysis 320, the computing device can re-assign a different aircraft assigned to the different one of the parking stands to the parking stand.

Figure 4:
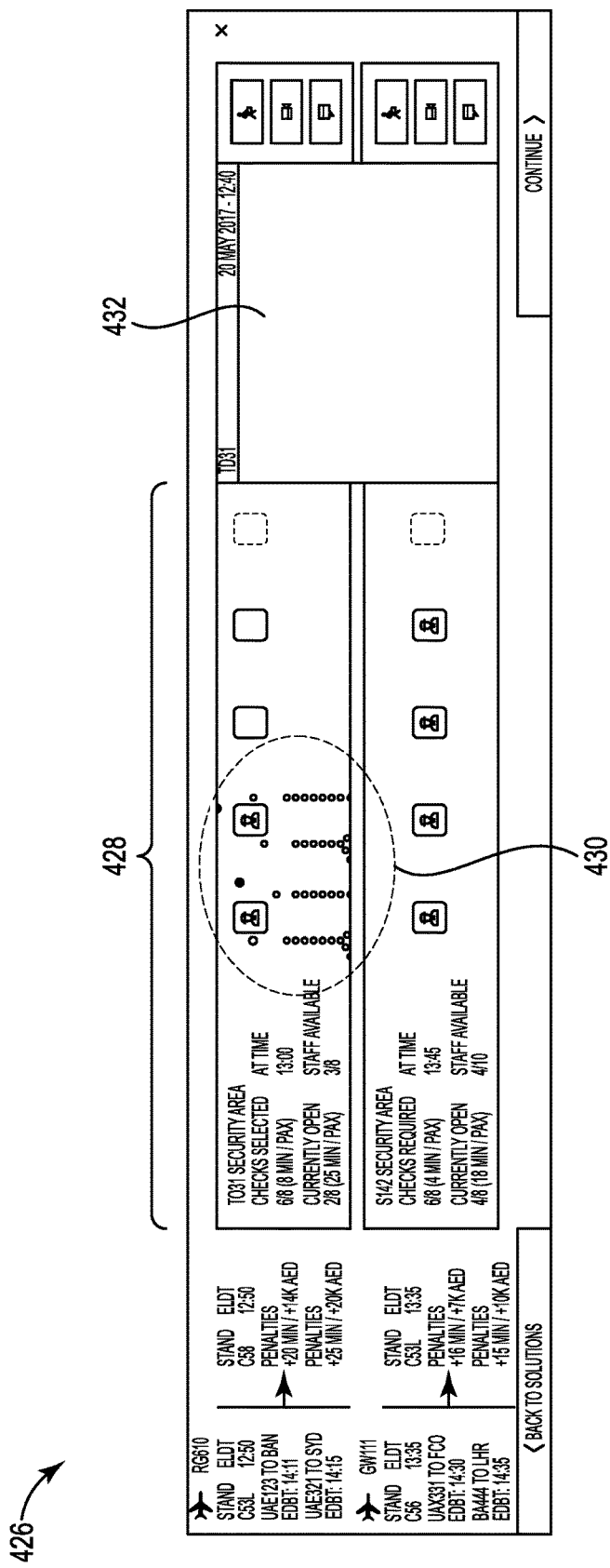
FIG. 4 is an illustration of a display provided on a user interface showing an assignment security impact analysis of a parking stand, in accordance with one or more embodiments of the present disclosure.

FIG. 4 is an illustration of a display provided on a user interface showing an assignment security impact analysis 426 of a parking stand, generated in accordance with one or more embodiments of the present disclosure. The assignment security impact analysis 426 can include security checkpoint details 428 for the airport, real time passenger flow indicator 430 for the airport, and/or video of security checkpoint 432 of the airport.

Similar to the assignment penalty analysis described in FIG. 3, prior to assigning an aircraft to one of the different parking stands, a user can review various impacts on security assigning the aircraft to one of the different parking stands may have. For instance, a user can review the impact on passenger flow through security checkpoints based on assigning the aircraft to one of the different parking stands.

Assignment security impact analysis 426 can include security checkpoint details 428 for the airport. Security checkpoint details 428 can include recommendations for number of security checkpoints that should be opened as a result of the assignment of an aircraft to one of the different parking stands, time per passenger at each security checkpoint that is open as a result of an assignment of an aircraft to one of the different parking stands, the time when a security checkpoint that is closed should be opened as a result of the assignment of an aircraft to one of the different parking stands, and/or the number of checkpoints that are currently open, among other security checkpoint details.

For example, as illustrated in FIG. 4, security area T031 is indicated as having 2 of 8 security checkpoints open, which can result in a time per passenger to get through those security checkpoints of 25 minutes. These details can be color coded. For example, the current 2 of 8 security checkpoints and the time per passenger (e.g., 25 MIN/PAX) can be indicated as red, which can indicate a penalty. The computing device can recommend that four more security checkpoints are opened, resulting in 6 of 8 security checkpoints being opened and a time per passenger of 8 minutes to get through those security checkpoints.

Assignment security impact analysis 428 for the parking stand can include a real time passenger flow indicator 430 for the airport. For example, passenger flow indicator 430 can show the flow of passengers through the checkpoints that are open. Passenger flow indicator 430 can show a user whether there are lines or queues at the security checkpoints that are open. A user can correspondingly recommend to open more security checkpoints if lines or queues result in a time per passenger to get through those security checkpoints that are open is longer than a predetermined and/or configurable threshold of time.

Assignment security impact analysis 426 for the parking stand can include video of a security checkpoint of the airport. For example, a user can select, via the assignment security impact analysis 426, to view video feeds of security checkpoints. The video feeds may be closed circuit television (CCTV) feeds, among other types of video feeds. The user can view the video of a security checkpoint to see real time lines or queues at security checkpoints, and can recommend more or less security checkpoints be opened and/or closed based on the video.

In some examples, following the assignment security impact analysis 426, the computing device can assign an aircraft to one of the different parking stands in response to the conflict existing at the parking stand. In some examples, following the assignment security impact analysis 426, the computing device can re-assign a different aircraft assigned to the different one of the parking stands to the parking stand.

FIG. 5 is an illustration of a display provided on a user interface showing an assignment security impact analysis 526 (e.g., parking stand assignment security impact analysis 426, previously described in connection with FIG. 4) of a parking stand with messaging options 534, generated in accordance with one or more embodiments of the present disclosure.

Assignment security impact analysis 526 can include messaging options 534. A user can utilize message options 534 to send a message to other users, such as a terminal controller, to request opening or closing of security checkpoints. For example, as illustrated in FIG. 5, a user can request that 6 security checkpoints in the T031 security area be opened, starting at 13:00.

In some examples, the messages can be predefined messages. For example, the messages can include predefined requests to open or close a chosen number of security checkpoints, among other types of predefined messages.

In some examples, the messages can be custom messages. For example, the user may type a custom message to another user to request security checkpoints be opened or closed, or request other action items.

In some examples, following the assignment security impact analysis 526, the computing device can assign an aircraft to one of the different parking stands in response to the conflict existing at the parking stand. In some examples, following the assignment security impact analysis 526, the computing device can re-assign a different aircraft assigned to the different one of the parking stands to the parking stand.

FIG. 6 is a computing device 636 for aircraft stand management, in accordance with one or more embodiments of the present disclosure. As illustrated in FIG. 6, computing device 636 can include a user interface 642, memory 640 and a processor 638 for aircraft stand management in accordance with the present disclosure.

The computing device 636 can generate the airfield parking stand analysis (e.g., airfield parking stand analysis 100, 200, previously described in connection with FIGS. 1 and 2, respectively) by compiling training data using classifiers. Compiling training data can include aggregating multiple criteria used in the generation of the airfield parking stand analysis, including the generation of the list of different parking stands to assign an aircraft to in response to a conflict existing at a parking stand.

Two groups of criteria may exist. There may be cost oriented criteria and comfort oriented criteria.

Cost oriented criteria can include penalties for delays (e.g., monetary penalties paid to airlines as specified in contracts with an airport), salaries of employees at security checkpoints, costs related to transportation of passengers to and/or from remote parking stands, compensation to connecting passengers for missed connecting flights, among other types of cost oriented criteria. Cost oriented criteria can be labeled using the variable $y^{(cost)}$.

Comfort oriented criteria can include passengers' waiting time, waiting time regarding remote stands with bus transportation, among other types of comfort oriented criteria. Comfort oriented criteria can be calculated by aggregative statistics, such as worst waiting times, average waiting times, etc. Comfort oriented criteria can be labeled using the variable $y^{(comf)}$.

In order to combine cost oriented criteria and comfort oriented criteria, preferences can be elicited from users based on historical and/or hypothetical situations. For example, historical situations may be based on historical data, and hypothetical situations may be based on a user and/or expert being shown a historical situation and informed about alternative options for a case regarding parking stand allocation and its corresponding criteria. Historical situations can be indexed by $t=1, \ldots T$.

Regarding hypothetical situations, for case t, two options may be available, although embodiments of the present disclosure are not limited to two options. For example, more than two options may be available.

In the example in which two options are available, a user and/or expert may be shown $y_{t,1}^{(cost)}$, $y_{t,1}^{(comf)}$, $y_{t,2}^{(cost)}$, $y_{t,2}^{(comf)}$ and can decide for either option one (e.g., t1) or option two (e.g., t2). The decision by the user and/or expert can be recorded as $z_t$. Following labeling of a sufficient number of examples T, a classifier can be trained. The classifier can then be able to compare any combination of $y_{\cdot,1}^{(cost)}$, $y_{\cdot,1}^{(comf)}$, $y_{\cdot,2}^{(cost)}$, $y_{\cdot,2}^{(comf)}$ and decide whether to prefer option one or option two. Having a set of alternatives $(y_{\cdot,i}^{(cost)}, y_{\cdot,i}^{(comf)})_{i=1}^{n}$, the classifier can sort the set of alternatives and select the most promising combination.

The computing device 636 can generate the airfield parking stand analysis by generating what-if models using the received information associated with arriving and departing flights at an airport and machine learning. For example, utilizing machine learning, once a classifier is available, decision support can be executed by computing device 636. For example, computing device 636 can detect all possible parking stands. For instance, computing device 636 can determine parking stands on the time chart (e.g., time chart 102, previously described in connection with FIG. 1) that have a sufficiently long time slot to serve an aircraft to be assigned to a parking stand. The parking stands can be indexed by $j=1, \ldots J$.

For each of the available stands, various alternative settings can be considered (e.g., the number of security checkpoints open, etc.) The alternative settings may be assumed to be discrete, where $K_j$ can be the number of alternative configurations for available parking stand j.

Various machine learning mechanisms may be employed. For example, Naïve Bayes, decision trees, and/or deep learning may be employed, among other machine learning mechanisms.

The computing device 636 can generate the list of different parking stands using the classifiers and the what-if models. All considered criteria for each option can be quantified according to $(y_{j,k}^{(cost)}, y_{j,k}^{(comf)})$ where $j=1, \ldots J$ and $k=1, \ldots K_j$. The classifier can be utilized to get the maximum out of all options. Options may be proposed and can be ranked accordingly. The what-if models may be chained in the case of connecting flights.

Computing device 636 can be, for example, a laptop computer, a desktop computer, and/or a mobile device (e.g., a smart phone, tablet, personal digital assistant, smart glasses, a wrist-worn device, etc.), and/or redundant combinations thereof, among other types of computing devices.

The memory 640 can be any type of storage medium that can be accessed by the processor 638 to perform various examples of the present disclosure. For example, the memory 640 can be a non-transitory computer readable medium having computer readable instructions (e.g., computer program instructions) stored thereon that are executable by the processor 638 for aircraft stand management in accordance with the present disclosure. The computer readable instructions can be executable by the processor 638 to redundantly generate the aircraft stand management.

The memory 640 can be volatile or nonvolatile memory. The memory 640 can also be removable (e.g., portable) memory, or non-removable (e.g., internal) memory. For example, the memory 640 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 640 is illustrated as being located within computing device 636, embodiments of the present disclosure are not so limited. For example, memory 640 can also be located internal to another computing resource (e.g., enabling computer readable instructions to be downloaded over the Internet or another wired or wireless connection).

As illustrated in FIG. 6, computing device 636 includes a user interface 642. For example, the user interface 642 can display aircraft stand management (e.g., as previously described in connection with FIGS. 1-5) in a single integrated display. A user (e.g., operator) of computing device 636 can interact with computing device 636 via user interface 642. For example, user interface 642 can provide (e.g., display and/or present) information to the user of computing device 636, and/or receive information from (e.g., input by) the user of computing device 636. For instance, in some embodiments, user interface 642 can be a graphical user interface (GUI) that can provide and/or receive information to and/or from the user of computing device 636. The display can be, for instance, a touch-screen (e.g., the GUI can include touch-screen capabilities). Alternatively, a display can include a television, computer monitor, mobile device screen, other type of display device, or any combination thereof, connected to computing device 636 and configured to receive a video signal output from the computing device 636.

As an additional example, user interface 642 can include a keyboard and/or mouse the user can use to input information into computing device 636. Embodiments of the present disclosure, however, are not limited to a particular type(s) of user interface.

User interface 642 can be localized to any language. For example, user interface 642 can display the aircraft stand management in any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for aircraft stand management, comprising:
    a memory;
    a processor configured to execute executable instructions stored in the memory to:
        receive information associated with arriving and departing flights at an airport;
        determine, using the received information, whether a conflict exists at a parking stand of the airport assigned to an aircraft;
        generate, using the received information, an airfield parking stand analysis, including:
            a time chart for the parking stand; and
            a prioritized list of different parking stands to assign to the aircraft in response to a conflict existing at the parking stand, wherein the list is prioritized according to airline attributes including terminals specific to particular airlines; and
    a user interface configured to display the airfield parking stand analysis in a single integrated display.

2. The computing device of claim 1, wherein the processor is configured to execute the instructions to assign the aircraft to one of the different parking stands in response to the conflict existing at the parking stand.

3. The computing device of claim 2, wherein the processor is configured to execute the instructions to re-assign a different aircraft assigned to the different one of the parking stands to the parking stand.

4. The computing device of claim 1, wherein the time chart for the parking stand includes:
    an estimated in block time of the aircraft at the parking stand; and
    an estimated off block time of the aircraft from the parking stand.

5. The computing device of claim 1, wherein the list of different parking stands is prioritized according to at least one of:
    parking stand attributes;
    passenger attributes;
    reallocation impact attributes; and
    aircraft scheduling attributes.

6. The computing device of claim 1, wherein the processor is configured to execute the instructions to generate a map of the airport showing the parking stand, a status of the parking stand, the different parking stands, and the aircraft at the airport.

7. The computing device of claim 1, wherein a conflict exists at the parking stand when an in block time of the aircraft assigned to the parking stand and an in block time of a different aircraft assigned to the parking stand overlap.

8. A non-transitory computer readable medium having computer readable instructions stored thereon that are executable by a processor to:
    receive information associated with arriving and departing flights at an airport;
    determine, using the received information, whether a conflict exists at a parking stand of the airport assigned to an aircraft;
    generate, using the received information, an airfield parking stand analysis, including:
        a time chart for the parking stand;
        a prioritized list of different parking stands to assign to the aircraft in response to a conflict existing at the parking stand, wherein the list is prioritized according to airline attributes including terminals specific to particular airlines;
        an assignment penalty analysis for the parking stand; and
        an assignment security impact analysis for the parking stand;
    assign, based on the airfield parking stand analysis, the aircraft to one of the different parking stands in response to the conflict existing at the parking stand; and
    display the airfield parking stand analysis in a single integrated display.

9. The computer readable medium of claim 8, wherein the assignment penalty analysis for the parking stand includes details of the different parking stands.

10. The computer readable medium of claim 9, wherein the assignment penalty analysis for the parking stand includes penalties associated with the details of the different parking stands.

11. The computer readable medium of claim 10, wherein the computer readable instructions are executable by the processor to revise the penalties in response to a change in one of the details of the different parking stands.

12. The computer readable medium of claim 8, wherein the assignment security impact analysis for the parking stand includes security checkpoint details for the airport.

13. The computer readable medium of claim 8, wherein the assignment security impact analysis for the parking stand includes a passenger flow indicator for the airport.

14. The computer readable medium of claim 8, wherein the assignment security impact analysis for the parking stand includes video of a security checkpoint of the airport.

15. The computer readable medium of claim 8, wherein the assignment security impact analysis for the parking stand includes messaging options for the airport.

16. A computer implemented method for aircraft stand management, comprising:

determining, by a computing device using information associated with arriving and departing flights at an airport, whether a conflict exists at a parking stand of the airport assigned to an aircraft;

generating, by the computing device using the received information, an airfield parking stand analysis, including:

a time chart for the parking stand;

a prioritized list of different parking stands to assign to the aircraft in response to a conflict existing at the parking stand, wherein the list is prioritized according to airline attributes including terminals specific to particular airlines;

an assignment penalty analysis for the parking stand;

an assignment security impact analysis for the parking stand; and a map of the airport showing the parking stand, the different parking stands, and the aircraft at the airport;

assigning, by the computing device based on the airfield parking stand analysis, the aircraft to one of the different parking stands in response to the conflict existing at the parking stand; and displaying, on a user interface of the computing device, the airfield parking stand analysis in a single integrated display.

17. The method of claim 16, wherein the method includes generating and displaying, on the user interface, an alert in response to the conflict existing at the parking stand.

18. The method of claim 16, wherein generating the airfield parking stand analysis includes compiling training data using classifiers.

19. The method of claim 16, wherein generating the airfield parking stand analysis includes generating what-if models using the information associated with arriving and departing flights at the airport and machine learning.

20. The method of claim 16, wherein the method includes generating the list of different parking stands using classifiers and what-if models.

* * * * *